United States Patent
Renninger et al.

(10) Patent No.: US 7,980,125 B2
(45) Date of Patent: Jul. 19, 2011

(54) SENSOR SYSTEM FOR DETERMINING A PARAMETER OF A FLUID MEDIUM

(75) Inventors: Erhard Renninger, Markgroeningen (DE); Uwe Konzelmann, Asperg (DE); Christoph Gmelin, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/734,686

(22) PCT Filed: Oct. 20, 2008

(86) PCT No.: PCT/EP2008/064111
§ 371 (c)(1),
(2), (4) Date: Aug. 13, 2010

(87) PCT Pub. No.: WO2009/068368
PCT Pub. Date: Jun. 4, 2009

(65) Prior Publication Data
US 2010/0300187 A1    Dec. 2, 2010

(30) Foreign Application Priority Data

Nov. 26, 2007 (DE) .................. 10 2007 056 888

(51) Int. Cl.
*G01F 1/68* (2006.01)
(52) U.S. Cl. .................................... 73/204.11

(58) Field of Classification Search ............... 73/204.11, 73/204.21, 204.23, 861.24, 861.52, 861.83, 73/861.22, 114.42
See application file for complete search history.

(56) References Cited

U.S. PATENT DOCUMENTS

| | | | | |
|---|---|---|---|---|
| 4,397,192 A * | 8/1983 | Mollet | ...................... | 73/861.22 |
| 4,559,275 A | 12/1985 | Matt et al. | | |
| 5,363,699 A * | 11/1994 | McCall | ........................ | 73/198 |
| 5,596,152 A * | 1/1997 | Bergervoet et al. | ........ | 73/861.83 |
| 6,553,808 B2 * | 4/2003 | Bonne et al. | ................. | 73/24.01 |
| 7,302,862 B2 * | 12/2007 | Fujiwara et al. | ........... | 73/861.52 |
| 7,891,239 B2 * | 2/2011 | Inagaki et al. | ................. | 73/202 |
| 7,905,153 B2 * | 3/2011 | Jasnie | ........................ | 73/861.24 |

FOREIGN PATENT DOCUMENTS

| | | |
|---|---|---|
| DE | 33 20 753 | 12/1983 |
| DE | 196 01 791 | 7/1997 |
| DE | 196 47 081 | 5/1998 |
| DE | 199 13 654 | 10/1999 |
| JP | 55-122120 | 9/1980 |
| JP | 10-48021 | 2/1998 |

\* cited by examiner

*Primary Examiner* — Jewel Thompson
(74) *Attorney, Agent, or Firm* — Kenyon & Kenyon LLP

(57) ABSTRACT

A sensor system for determining at least one parameter of a fluid medium flowing in a main flow direction has at least one sensor situated in the fluid medium, for determining the parameter of the fluid medium, and at least one grating situated transversely to the main flow direction and having at least one crosstie, the crosstie having a crosstie depth directed essentially in the main flow direction. The crosstie has at least one recess, the crosstie depth being reduced in the recess.

10 Claims, 3 Drawing Sheets

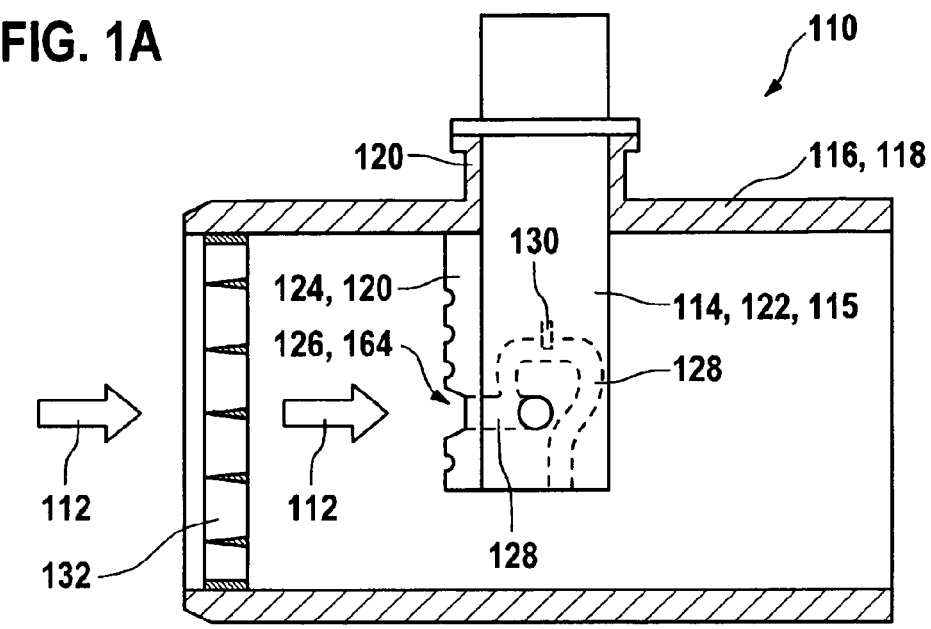
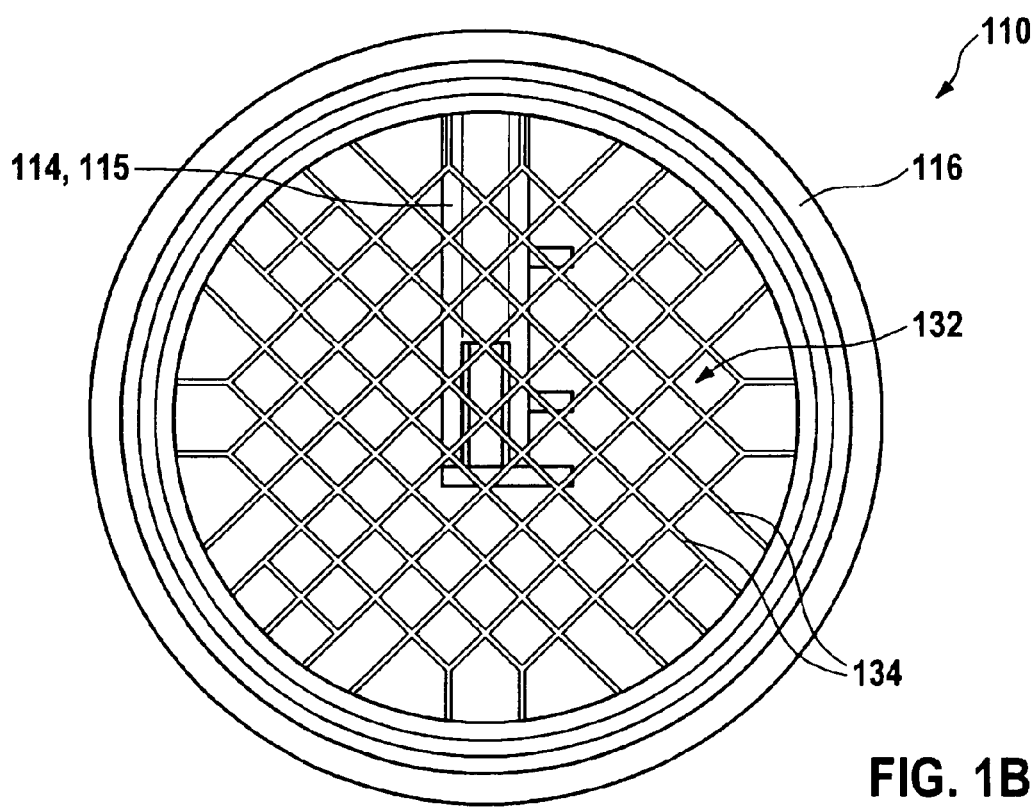

SENSOR SYSTEM FOR DETERMINING A PARAMETER OF A FLUID MEDIUM

BACKGROUND OF THE INVENTION

1. Field of the Invention

The present invention relates to a device for measuring at least one parameter of a flowing fluid medium, in particular a fluid medium flowing through a flow pipe.

2. Description of Related Art

In many processes such as, for instance, in the field of industrial processing engineering, chemistry or machine construction, fluid media, especially masses of gas (e.g. an air mass) having particular properties (such as temperature, pressure, flow speed, mass flow, volume flow, etc.) have to be supplied. Among these are combustion processes, in particular, which run under regulated conditions.

An important application example is the combustion of fuel in internal combustion engines of motor vehicles, especially ones having subsequent catalytic exhaust gas purification, in which a certain air mass has to be supplied per unit time in a controlled manner (air mass flow). Various types of sensors are used to measure the air-mass throughput, in this instance. One sensor type known from the related art is what is generally known as a hot-film air mass sensor (HFM), which is described in one specific embodiment described in published German patent document DE 196 01 791 A1, for example. A sensor chip, which has a thin sensor diaphragm, e.g., a silicon sensor chip, is generally utilized in such hot-film air mass meters. At least one thermal resistor, which is surrounded by two or more temperature measuring resistors (temperature sensors), is typically situated on the sensor diaphragm. In an air flow that is routed across the diaphragm there is a change in the temperature distribution, which in turn is detectable by the temperature measuring resistors and is able to be evaluated with the aid of a control and evaluation circuit. Thus, for instance, an air mass flow is able to be determined from a difference in resistance of the temperature measuring resistors. A number of other variations of this sensor type is known from the related art. The present invention is also not limited to the sensor type of the hot film air mass sensor described, but may basically be used as most types of sensors being utilized as stationary installed sensors or as plug-in sensor in a flowing medium.

However, in the plug-in sensor constructions described in the related art it is disadvantageous that the plug-in sensors described, often cause problems in the intake tract with regard to a pressure loss attributable to flow resistance. This means, in particular, that the reproducibility of the signals of such sensors is not optimal.

Many sensors, particularly hot film air mass sensors, are supplied, in practice, with a grating or a grating combination. These gratings may be integrated into a flow pipe, for example, and are usually positioned a few centimeters upstream of the plug-in sensor or sensor in the flow, and they have the task to even out the speed profile in the flow pipe. Such gratings furthermore have the task of removing any swirl that may possibly be present from the flow. The evening-out effect of the grating is achieved by its braking effect on the flow. A small-scale turbulence is produced at the same time, which mixes fast and slow flowing fluid, and thus contributes to a speed equalization over the entire pipe cross section. The result is that the characteristics curve of the sensor (for instance, a relationship between air mass and output frequency or output voltage) is nearly independent of the speed profile of the inflowing air.

One example of such a device having a grating is known from published German patent document DE 196 47 081 A1. In contrast to known gratings, in which equal-sized, equidistant flow openings are provided, it is proposed, for these gratings, that flow openings having different flow-through cross sections be provided. The flow-through cross sections are adjusted to the inflow, so as to effect a flow downstream from the grating having an essentially even speed distribution.

Unfortunately, however, many sensors, particularly many air mass sensors, in combination with known grating constructions, demonstrate characteristics curves in some air mass ranges whose reproducibility leaves room for further improvement. The cause for this is usually an instability of the flow directly after the grating crossties. In the wake of the grating crossties, detachment areas form and irregularities in the speed profile, which are unstable in principle, so that the measured values of the sensors situated downstream from the grating constructions may also be unstable.

BRIEF SUMMARY OF THE INVENTION

The present invention therefore provides a sensor system for determining at least one parameter of a fluid medium flowing in a main flow direction, as well as a flow pipe segment for use in such a sensor system, which avoid the disadvantages of known sensor systems and flow pipe segments. The provided sensor system particularly has a stable flow in the region of a sensor, especially in the wake of a grating, and thus it has greater reproducibility. One may preferably do without other flow-stabilizing measures, such as additional wire gratings, so that production costs for the provided sensor system may be reduced compared to usual sensor systems. All in all, the sensor system has a good signal quality compared to usual sensor systems especially an improved signal noise.

The sensor system is basically suitable for a number of sensors and measuring principles mentioned at the outset, as well as for a plurality of fluid media (such as gases and liquids). In principle, one is able to measure a number of possible physical and/or chemical parameters, such as pressure, temperature, density, mass throughput, volume throughput or the like. Accordingly, the sensor system has at least one sensor which is adapted to the type of the parameter(s) to be measured. In the following, let it be assumed, without limiting additional possible embodiments of the present invention, that the sensor includes a hot film air mass sensors, as is described, for example, in published German patent document DE 196 01 791 A1 that was named at the outset, or in additional documents cited in the related art.

The fluid medium may basically flow freely in the main flow direction, the main flow direction being understood to mean the local flow direction of the medium in the vicinity of the sensor system. In this instance, however, irregularities such as turbulences, should not be considered, so that by main flow direction one should understand the main transportation direction in which the fluid medium is being transported in the vicinity of the sensor system. The fluid medium preferably flows through a flow pipe, the sensor system being able to include, for example, a flow pipe segment having at least one housing, into which the at least one sensor is able to be inserted (using at least one accommodation).

The sensor system also has at least one grating having at least one crosstie, that is situated transversely to the main flow direction. A plurality of such crossties is preferably provided which may be oriented parallel and/or at angles differing from 0° from one another. A grating having crossties crossing one another is also conceivable, for instance, analogous to the abovementioned related art. The grating is preferably a part of said flow pipe segment, for instance, in the form of a removable part of this flow pipe segment. The term "transversely to the direction of flow" should preferably be understood to mean an angle of 90° between the crossties and the main flow direction, in this context, deviations from 90° being also conceivable, such as deviations by not more than 20°. In this respect, the grating may correspond, for instance, to the related art cited at the outset, such as the system described in published German patent document DE 196 47 081 A1.

By contrast to the related art, the present invention is based to the realization that the instabilities named, of the flow directly downstream from the grating crossties are caused by detachment regions and notches ("dents") in the speed profile. In particular, in gratings having crossed grating crossties, these irregularities are superposed in the speed profiles at the grating crossing points, to form local minima in the speed profile downstream from the grating, which usually have an effect over a path of 5 to 10 times the depth of the grating in the main flow direction. These local minima are associated with the detachment regions that form in the wake of the grating crossing points. These dead water zones are unstable and react very sensitively to the smallest change in inflow conditions, and based on these changes, change, for instance, their shape, size and position, and in this way they influence the characteristics curves of the sensor element or their reproducibility. In addition, these zones are largely nonstationary, and thus they intensify the signal noise.

One basic idea of the present invention is therefore to minimize and to stabilize the detachment regions in the wake of the grating, especially in the vicinity of the grating crossing points, in order to reduce the signal noise and to improve signal reproducibility. For this purpose, it is provided that the crosstie have a depth that is essentially directed in the main flow direction, the crossties having at least one recess at which the depth of the crosstie is reduced. By "directed essentially in the main flow direction" one should understand a crosstie depth which is preferably oriented parallel to the main flow direction, but slight deviations from this parallelism, such as by not more than 50°, preferably not more than 20° and especially preferably not more than 5° being also tolerable.

The recess according to the present invention basically results in two effects. Thus, by a local reduction of the influence of the wall, the speed profile becomes more homogeneous and more stable. The detachment regions behind the grating crossties become smaller. Furthermore, in the recesses provided in the crossties, longitudinal turbulences are generated which ensure a reinforced pulse exchange between a slow fluid medium (in the detachment zone) and fast fluid medium (outside the detachment zone) behind the crossties. Because of this, too, the detachment regions are diminished and stabilized, and the speed profile is made homogeneous.

The at least one recess is preferably at a rear edge of the crosstie that is situated downstream from the main flow direction. Recesses at the front edge of the crosstie act basically the same, but they themselves produce disturbances, as a rule, and are less efficient, as a rule, than the provided variant of the recess at the rear edge.

Rectangular recesses are favored, in this context, that is, recesses in the form of a rectangular profile in the crossties. However, the recesses may basically also have other profiles, for instance, trapeze-shaped recesses having lateral angles that deviate from 90°. Thus, trapeze-shaped profiles having a trapeze angle 90° (rectangular profile) and 30° are comparable in their functioning to rectangular recesses, and may particularly also have advantages in the production of the sensor system, and particularly of the grating. Basically, rounded profiles are also conceivable, such as rectangular and/or trapeze-shaped profiles that are rounded in the edge region. It should be pointed out that the profiles of the recesses, provided several recesses are provided in the grating, do not all have to be identical, but the design of the recesses may also vary over the grating.

The depth of the recesses, i.e. the maximum reduction in the crosstie depth in the recesses, is preferably in the range of ca. 50% of the grating depth, that is, preferably in the main flow direction. In addition, however, other grating depths are possible, for instance, grating depths in the range between 10% and 80% of the crosstie depth.

The recesses may basically be situated at any location in the grating. As described above, it is however particularly preferred if the grating has at least two crossties that intersect at least one crossing point, preferably four or more crossties. The crossing crossties may basically be situated at any desired angles to each other different from 0°, angles in the range of 90° being preferred, however. Deviations from 90° are also possible, however, for instance, deviations by not more than 40°. In this way, a mesh grating may be developed by the crossing crossties, having a mesh aperture of 4 to 7 mm, for example, other designs of the meshes also being possible. Various values for the crosstie depth are also basically possible, typical values in the range between 5 and 10 mm being used.

In the case of such a mesh grating having at least two crossing crossties, it is especially preferred if the at least one recess is situated in the region of the at least one crossing point. As described above, this effects a particularly effective stabilization of the flow in these regions of the crossing points that are critical in flow technology. Recesses may be provided, in this context, on one of the crossties that cross each other or on both crossing crossties, in the vicinity of the crossing points. Basically, all the crossing points may be provided with such a recess, embodiments being also possible in which only some and not all the crossing points are provided in such a way with recesses.

It is particularly preferred to position the one recess, regardless of whether it is situated at a crossing point and/or at a crosstie outside of a crossing point, upstream, before a measuring range of the sensor. In this way, the recess develops its stabilizing effect, particularly in the region of this measuring range. Thus, the measuring range may directly include a measuring range, for example, of a sensor element (e.g. a sensor chip for recording the at least one parameter). In the case of a hot film air mass sensor, which usually has a plunge sensor that penetrates into the flow, having a measuring channel situated in the plunge sensor, it is especially preferred if the recess is situated upstream of an inlet of this measuring channel. It is particularly preferred if the at least one recess is situated in the region of a projection of the measuring range along the main flow direction towards the grating, so that the at least one recess develops its effect in the vicinity of the measuring range.

The at least one crosstie is preferably designed to have a rounded front edge pointing in the opposite direction to the main flow direction. On the other hand, the rear edge may be developed to have a sharp edge, particularly for the development of eddies, and may, for instance, have a flat area oriented essentially vertically to the main flow direction.

As was described above, besides the sensor system, a flow pipe segment is provided for use in a sensor system in one of the specific embodiment described. Therefore, for the design of the sensor system, one may extensively refer to the above description. The flow pipe segment includes at least one housing having at least one accommodation for inserting the sensor. With reference to the possible designs of the sensor, one may again refer extensively to the above description. It is particularly preferred if the sensor is developed as a plunge sensor. The accommodation may be designed so that the sensor is fixedly installed in the accommodation and/or is able to be developed in such a way that the sensor is able to be inserted into the accommodation exchangeably (for instance, as an exchangeable plug-in sensor). Both variants are conceivable. As is also known from the related art, the accommodation may include additional flow guiding elements, for instance, a rounded leading edge, situated upstream of the sensor, and/or of the flow guidance elements. The flow pipe segment may additionally include further guidance elements.

The flow pipe segment also has at least one grating having at least one crosstie, that is situated transversely to the main flow direction. For the design of this grating, one may extensively refer to the above description. This at least one crosstie has at least one recess, in which the crosstie depth is reduced. The grating may also be designed as an exchangeable part of the flow pipe segment, and may in this way be produced in a separate production process, (e.g. an extrusion process), for example. The flow pipe segment may also include further elements, such as fastening elements, using which the flow pipe segment may be inserted into an exhaust gas tract of an internal combustion engine, and fixed there.

BRIEF DESCRIPTION OF SEVERAL VIEWS OF THE DRAWING

FIGS. 1A and 1B show two different views of a possible exemplary embodiment of a sensor system according to the present invention.

DETAILED DESCRIPTION OF THE INVENTION

Figure 2:
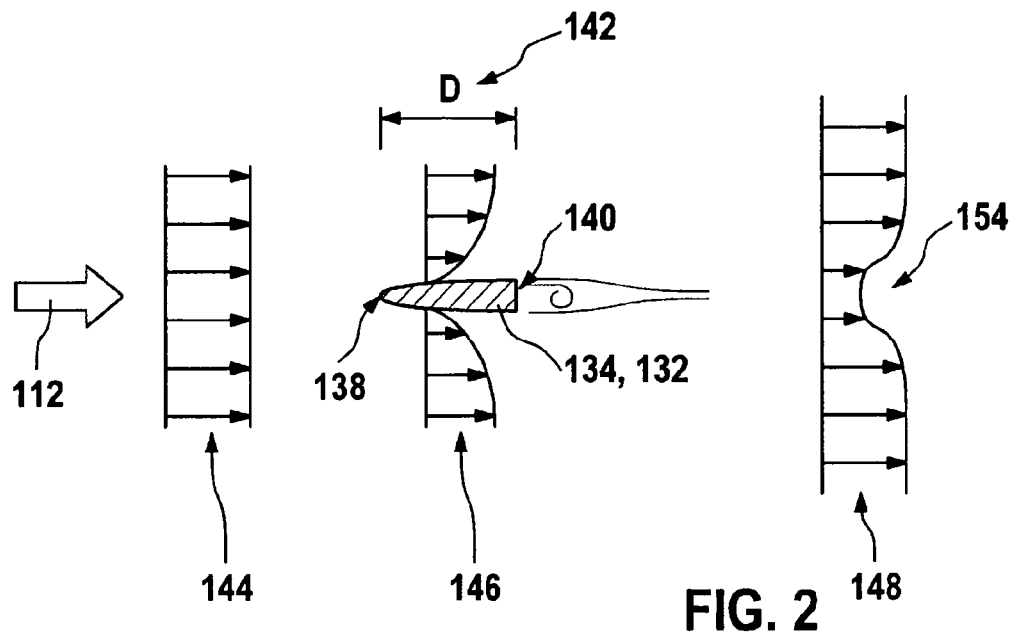
FIG. 2 shows a schematic representation of the curve of the speed profile before and after a grating shown in FIGS. 1A and 1B.

FIGS. 1A and 1B show a sensor system 110, as is known from the related art, which may be commercially available (for example, in the form of a hot film air mass sensors of the type "HFM7" of the firm of Robert Bosch GmbH), and which may be modified, according to the present invention within the scope of the present invention. FIG. 1 shows a sectional representation of sensor system 110 from the side, whereas FIG. 1B shows sensor system 110 in the direction of view from the front, along a main flow direction 112 of a flowing fluid medium.

For the construction of sensor system 110 one may to a great extent refer to the related art. In this exemplary embodiment, sensor system 110 is embodied as a hot film air mass sensor system and has a hot film air mass sensor 114.

Sensor system 110 includes a flow pipe segment 116, having a housing 118. Housing 118 has an accommodation 120, into which a plunge sensor 122 of hot film air mass sensor 114 is able to be inserted. Accommodation 120 is designed, in this context, in such a way that it includes a leading edge 124 on the flow-in side of plunge sensor 122, for the design of which one may again refer to the related art. In leading edge 124, an inlet 126 is formed in the form of an opening. A flow channel 128 adjoins inlet 126, in plunge sensor 122, in which a sensor element 130 is situated. For the embodiment of flow channel 128 and sensor element 130, which condition the functioning of hot film air mass sensor 114, one may, for instance, refer again to the related art. All the elements are shown only schematically in FIGS. 1A and 1B.

As may be recognized particularly in FIG. 1B, flow pipe segment 116 of sensor system 110 also has a grating 132 situated upstream of plunge sensor 122. In the present exemplary embodiment, this grating 132 is designed as a mesh grating having a plurality of crossties 134 that cross one another in an essentially perpendicular manner. These crossties 134 cross one another at a plurality of crossing points 136. The grating may be designed, for instance, as a round individual part that may be removed from flow pipe segment 116, for which, for example, in flow pipe segment 116, on the inlet side, a groove may be provided for accommodating grating 132. Grating 132 as well as flow pipe segment 116 and parts of plunge sensor 122 may be wholly or partially designed as plastic components, for example, and may, for instance, contain a polyamide and/or a polybutylene terephthalate, having a 30% glass fiber filling, for example.

FIG. 2 shows a single crosstie 134 of grating 132, in a sectional representation. In this case, crossties 134 has a rounded front edge 138 and a rear edge 140 that is situated downstream with respect to main flow direction 112, with reference to front edge 138. In this exemplary embodiment, rear edge 140 is oriented essentially perpendicular to main flow direction 112. The extension of crosstie 134 between front edge 138 and rear edge 140 is designated as crosstie depth D, which is designated symbolically in FIG. 2 by reference numeral 142. This extension or crosstie depth is oriented essentially parallel to main flow direction 112.

In the illustration in FIG. 2, the speed profile of the flow of the fluid medium is shown, with the aid of which the problem having to do with crossties 134 is to be clarified. Thus, there is shown symbolically a speed profile 144 before the oncoming flow to crosstie 134 or grating 132, a speed profile 146 in the vicinity of grating 132 and a speed profile 148 downstream from grating 132.

In this context, one should first of all realize that, beginning from the original uniform embodiment of speed profile 144 (for example, in the vicinity of the middle of the flow pipe of flow pipe segment 116), in the region of grating 132 or crosstie 134, an almost complete braking of the fluid medium takes place, as shown in profile 146. After crosstie 134, a detachment area forms, which tends to fluctuations and instabilities. In the region behind grating 132, this braking at grating crossties 132 still becomes noticeable at a distance of 5 to 10 times crosstie depth D. Thus, one may recognize in FIG. 2 that in the region of the flowing fluid medium, which has flowed around crosstie 134, a local minimum 154 still occurs at some distance after crosstie 132. These local minima 154 are associated with detachment areas which develop in the wake of crossties 132, especially in the vicinity of crossing points 136.

Figure 3:
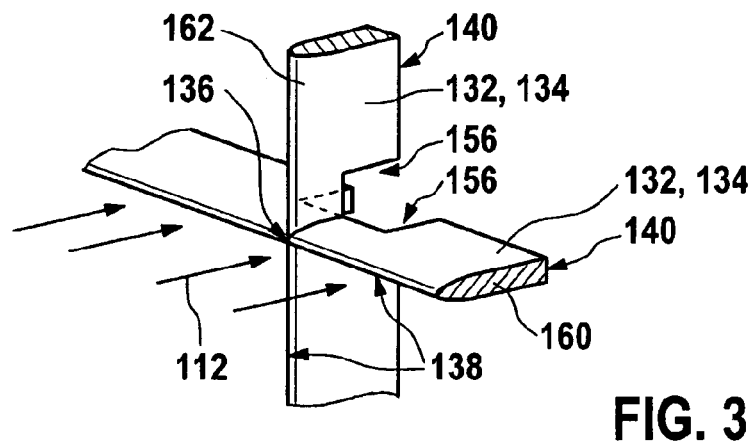
FIG. 3 shows an exemplary embodiment of a grating having recesses in the vicinity of the crossing points.
Figure 4:
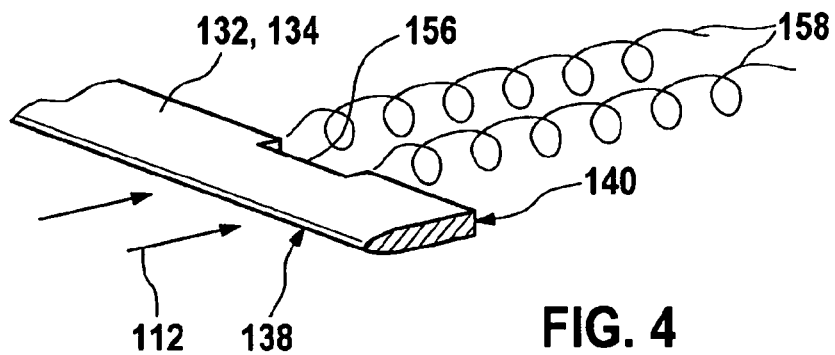
FIG. 4 shows an exemplary embodiment of a crosstie having a recess.
Figure 5:
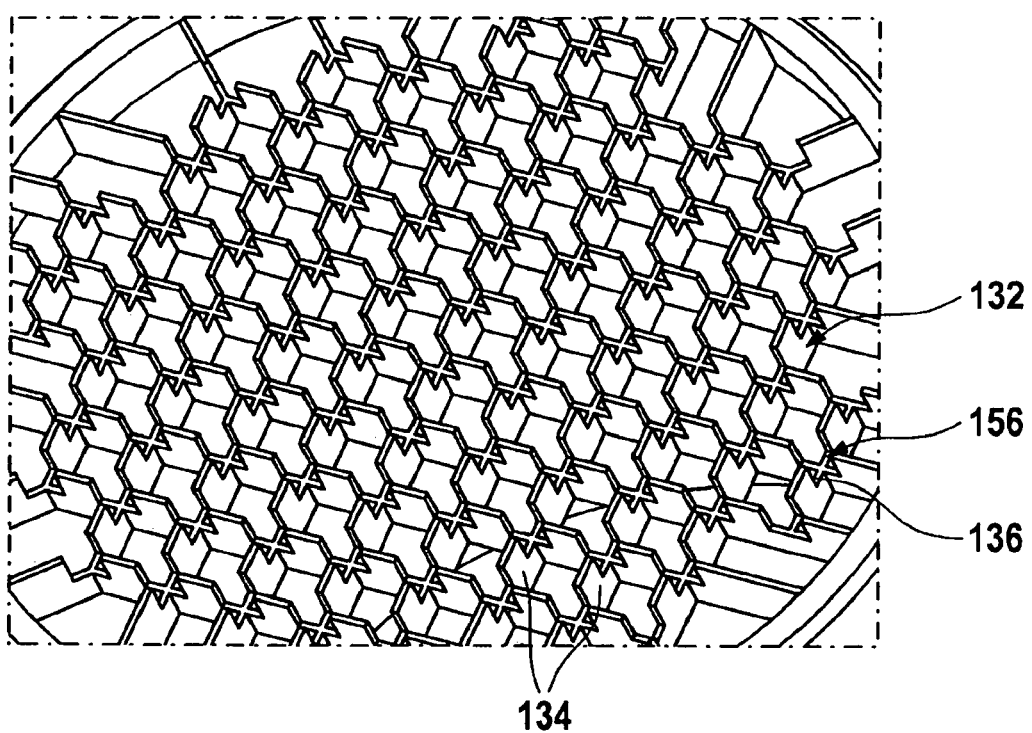
FIG. 5 shows a perspective partial representation of a grating having a plurality of crossing points that have recesses.

In FIGS. 3 to 5, by contrast, various embodiments, according to the present invention, of grating 132 or crossties 134 are shown in a perspective detailed illustration. Thus, FIG. 4 shows an exemplary embodiment of grating 132, in which a recess 156 is provided at rear edge 140. This recess 156, which is developed as a rectangular recess in the present exemplary embodiment, generates longitudinal eddies 158 downstream from crosstie 134, which have the effect, described above, of pulse exchange between slow fluid and fast fluid, and thus a faster decline of local minimum 154 in speed profile 148.

As was stated above, it is particularly favorable, in this instance, to position recesses 156 in the vicinity of crossing points 136 of two crossties. Such an exemplary embodiment of a grating 132 is shown in FIG. 3. In this case, one may see that a first crosstie 160 and a second crosstie 162 intersect at a crossing points 136, preferably at right angles. Each of the two crossties 160, 162 has recesses 156 at their rear edges 140, symmetrically about crossing point 136.

Finally, FIG. 5 shows a perspective representation of a top view onto grating 132 (having a FIG. 1A direction of view from the right, that is, counter to main flow direction 112). One may see here that, in this exemplary embodiment, essentially each of crossing points 136 of crossties 134 is furnished with recesses 156. As was stated above, however, another embodiment is also possible. Thus, in particular, one region of a projection onto grating 132 of a measuring region of a sensor may be connected to such recesses 156, but not the remaining regions of grating 132. If, for instance, a hot film air mass sensor 114 (see FIG. 1A) is used as sensor 115, measuring region 164 may, for instance, include inlet 126 of hot film air mass sensor 114. If this measuring region 164 is projected onto grating 132 along main flow direction 112, it is especially preferred if this region of the projection is furnished with such recesses 156.

What is claimed is:

1. A sensor system for determining at least one parameter of a fluid medium flowing in a main flow direction through a flow pipe, comprising:
   at least one sensor situated in the fluid medium and configured to determine the at least one parameter of the fluid medium;
   at least one grating situated transversely to the main flow direction and having at least one crosstie, wherein the crosstie has a crosstie depth directed essentially in the main flow direction, and wherein the crosstie has at least one recess in which the crosstie depth is reduced.

2. The sensor system as recited in claim 1, wherein the recess is situated on a rear edge of the crosstie located downstream with respect to the main flow direction.

3. The sensor system as recited in claim 2, wherein the recess has a recess depth between 10% and 80% of the crosstie depth.

4. The sensor system as recited in claim 3, wherein the recess has at least one of the following shapes: a rectangular profile; a trapeze-shaped profile having a trapeze angle between 90° and 30°; and a rounded profile.

5. The sensor system as recited in claim 3, wherein the grating has at least two crossties that intersect at least one crossing point, the recess being situated at least one of the crossties, in the vicinity of the crossing point.

6. The sensor system as recited in claim 5, wherein a plurality of crossing points is provided, no recess being situated at least one of the crossing points, and a recess being situated at least one of the crossing points.

7. The sensor system as recited in claim 3, wherein the sensor has at least one measuring region, and wherein the recess is situated upstream of the measuring region with respect to the main flow direction.

8. The sensor system as recited in claim 3, wherein the crosstie has a front edge facing counter to the main flow direction and a rear edge situated downstream from the front edge with respect to the main flow direction, and wherein the front edge has a rounded profile.

9. The sensor system as recited in claim 8, wherein the rear edge has an even surface oriented essentially perpendicular to the main flow direction.

10. The sensor system as recited in claim 3, further comprising:
    at least one housing having at least one accommodation for the sensor.

* * * * *